United States Patent [19]

Brand et al.

[11] Patent Number: 4,546,160

[45] Date of Patent: Oct. 8, 1985

[54] BULK POLYMERIZATION PROCESS FOR PREPARING HIGH SOLIDS AND UNIFORM COPOLYMERS

[75] Inventors: Julia A. Brand; Lee W. Morgan, both of Racine, Wis.

[73] Assignee: S. C. Johnson & Son, Inc., Racine, Wis.

[21] Appl. No.: 584,661

[22] Filed: Feb. 29, 1984

[51] Int. Cl.$^4$ ............................................. C08F 2/02
[52] U.S. Cl. .................................. 526/320; 526/317.1; 526/329.2
[58] Field of Search ...................... 526/317, 320, 329.2

[56] References Cited

U.S. PATENT DOCUMENTS

| 3,080,348 | 3/1963 | Lang | 260/86.7 |
|---|---|---|---|
| 3,466,269 | 9/1969 | Fivel | 526/317 |
| 3,673,168 | 6/1972 | Burke | 526/320 |
| 4,042,768 | 8/1977 | Muller | 526/329.2 |
| 4,075,242 | 2/1978 | Rhum | 526/320 |
| 4,117,235 | 9/1978 | Taylor | 526/320 |
| 4,137,389 | 1/1979 | Wingler | 526/317 |
| 4,141,806 | 2/1979 | Keggenhoff | 526/317 |
| 4,237,257 | 12/1980 | Moriya | 526/329.2 |
| 4,276,212 | 6/1981 | Khanna | 526/320 |
| 4,414,370 | 11/1983 | Hamielec | 526/88 |

Primary Examiner—Paul R. Michl

[57] ABSTRACT

A process to continuously bulk polymerize acrylic monomers to prepare low molecular weight, uniform, polymers employs minor amounts of initiator and, optionally solvents, at short residence times and moderate reaction temperatures to provide high yields of a product suitable for high solids applications.

13 Claims, No Drawings

BULK POLYMERIZATION PROCESS FOR PREPARING HIGH SOLIDS AND UNIFORM COPOLYMERS

CROSS-REFERENCE TO RELATED APPLICATION

This application is related to commonly assigned U.S. Pat. No. 4,414,370 issued Nov. 8, 1983 and to copending commonly assigned application Ser. No. 388,764 filed June 15, 1983 Pat. No. 4,529,787.

BACKGROUND OF THE INVENTION

This invention relates to a process for making copolymers of uniform molecular weight. In particular, it relates to the preparation of high solids, low molecular weight, copolymers having narrow weight distribution suitable for use in coatings, fluids, plasticizers, lubricants, etc.

Conventional solvent based industrial finishes and coatings have presented many problems to date. Solvents can pollute the workplace and environment; they are readily ignited, they are toxic, they are expensive, they lower the quality of the finish and they can color an otherwise clear finish. As a replacement for these solvent-based finishes, the trend in the polymer industry has been toward high solids, liquid coatings. Such coatings typically have a solids content of at least about 70% (non-volatiles).

High solids coatings offer significant advantages over conventional, solvent-thinned coatings. They do not pollute the air; they reduce or eliminate exudation of fumes in use; they reduce energy requirements for their preparation in terms of material, energy expended and labor and, unlike solvent-based systems, they do not present significant fire and toxicity problems. High solids coatings also provide substantial advantages over other high solids liquids, such as solventless, waterborne, powder and non-aqueous dispersion systems and they also offer a better balance of properties.

Perhaps the most difficult problem in preparing and utilizing high solids coatings is selection and control of viscosity. It is recognized that to control viscosity in the preferable range from about 0.1 to 5 poises, it is desirable to employ low molecular weight resins or oligomers, alone or in combination with a reaction solvent. Higher molecular weight resins are usually too viscous to be employed for high solids applications. Conventionally prepared low molecular weight resins (Mn-500 to 6000, especially 1000 to 3000) are subject to several significant defects.

To obtain resins of low viscosity and good overall application performance, it has been found necessary to make resins having very narrow molecular weight distributions, Takahashi, *Recent Advances In High Solids Coatings*, Polm. Plast. Technol. Eng. 15(1), pp. 1, 10 (1980). It has been postulated that the presence of high molecular weight polymer fractions dominates the viscosity characteristics of a high solids, low molecular weight resin. The relative presence or absence of high molecular weight fractions is indicated by the polydispersity ratio and the distribution index.

The polydispersity ratio (Mw/Mn, W/N or ratio of weight average molecular weight to number average molecular weight) is of vital importance to scientists in this field. Products having the same average molecular weight, but having a different molecular polydispersity possess different solution viscosities. The product with the higher polydispersity always has a higher solution viscosity, because high molecular weight fractions make a significantly greater contribution toward viscosity than low molecular weight fractions.

There is a another molecular weight measure known as the sedimentation average molecular weight, Mz. In relative terms, the $Mn < Mw < Mz$. If only one molecular species is present then $Mn = Mw = Mz$. However, this theoretical representation is not the case with polymers made by free radical processes.

Mz is a rather specific measure of the number of molecules in the higher weight fractions of the molecular weight range. The distribution index or ratio of (Mz/Mn or Z/N) is a key measure of the range of molecular weight distribution for a given resin, and provides an indication of the presence or absence of higher weight fractions. Products with a higher distribution index will exhibit higher solution viscosities and less desirable application properties. Contemporary industry standards require that a process to prepare resins suitable for high solids coating systems have sufficient flexibility to selectively increase or decrease the molecular weight of the desired product and its polydispersity and distribution ratios in accordance with market requirements.

In addition, products containing undue quantities of very low molecular weight fractions (dimers, trimers, etc.) can exhibit number average molecular weights (Mn) skewed to be nonreflective of the properties of the product and can introduce substandard properties to the product. These dimers, trimers, and other very low molecular weight oligomers, can make the product be quite nonuniform or heterogeneous, when compared to the desired product, especially if a terpolymer or tetrapolymer is prepared.

Applications for high solids coating compositions include coatings and finishes for cans, coils, fabrics, vinyls, papers, autos, furniture, magnet wire, appliances, metal parts, wood panels and floors. Other typical applications for such high solids resins are in paints, inks, adhesives, etc. and as tackifiers, dispersants, lubricants, functional fluids, etc. Such applications can require that copolymers be formed from a wide variety of monomers such as hard monomers, soft monomers, and monomers having functional groups such as carboxylic acid groups, amine groups and the like.

Attempts have been made to prepare high solids, low molecular weight acrylic (co)polymers in the 500 to 6,000 Mn range, due to the valuable advantages acrylics afford. Their relatively low cost, clear color, good outdoor durability, varying chemical resistances and good thermal stability are just some of the benefits attributed to acrylics. No process has been entirely successful in preparing a broad spectrum of high solids, low molecular weight non-styreneic acrylic polymer products at high yield and having a narrow molecular weight distribution and good color with a sufficiently low viscosity for practical use.

U.S. Pat. No. 4,414,370 discloses a process for continuously producing narrow molecular weight resins using a thermally initiated bulk process. While this process does produce resins with suitable molecular weights for use in high solids coatings, this process is thought to be primarily dependant on thermal initiation of the styrene type monomers. The process disclosed in this patent requires the presence of at least one monoalkenyl aromatic monomer.

An anionic process for making certain specific relatively narrow molecular weight acrylic oligomers with a Mn of 600 to 5,000 has been proposed as illustrated in U.S. Pat. No. 4,064,161. The polydispersity is said to be from 1.1 to 3. This anionic process presents distinct disadvantages, among which are: substantial residual levels of initiator fragments, the inability to copolymerize styrenic type monomers with the acrylic monomers (as noted in U.S. Pat. No. 4,137,389) and the inability to copolymerize oxyalkyl esters of acrylic or methacrylic acid. Further, a hydrolysis or transesterification step is required to obtain hydroxyl functional group containing oligomers for crosslinking purposes. This anionic process is also apparently not able to copolymerize an acrylic acid ester monomer with a methacrylic acid ester monomer.

Conventional free radical initiated processes for preparing low molecular weight acrylic copolymers have exhibited various defects and deficiencies. U.S. Pat. No. 3,028,367 proposed the use of organic thiol compounds for this purpose. These thiol produced products generally have offensive odors, varying color stability and poor outdoor weatherability. Further, the use of high levels of thiol compounds is required, which significantly effects the backbone composition of the polymer formed. U.S. Pat. No. 3,080,348 has suggested that the molecular weight of styrene-acrylate systems may be reduced by increasing reaction temperatures. However, this patent is said not to involve efforts to prepare low molecular weight polymers in the range from 500 to 6,000 as noted by U.S. Pat. No. 4,075,242.

U.S. Pat. No. 4,276,432 describes a process for making acrylic and/or styrenic copolymers with an Mn (as described by vapor phase osmometry) of 750 to 5,000. Reaction solvent is required at addition levels of 40 to 70% by weight of monomers. Long reaction times are employed from 1 to 10 hours. The excessive solvent stripping operation required due to the high levels of solvent employed in the process and the long feed times tend to make this process inefficient in terms of labor and capital expended, unduly time consuming and energy inefficient. The use of excessive amounts of inflammable, toxic and polymer contaminating solvent is a major problem.

Previously, styrene monomer has been homopolymerized to form high molecular weight polymers from 20,000 to 100,000 average molecular weight (Mw) in a continuous mass polymerization process without solvents, catalytic initiators and molecular weight regulators, as disclosed in U.S. Pat. Nos. 2,496,653 and 3,859,268. It has been generally recognized that at temperatures above about 200° C., thermally initiated styrene polymerization produces an undesired molecular weight fraction (dimers, trimers, etc.) causing a wide range of molecular weight and having a high polydispersity (Mw/Mn). Exceptions to this are U.S. Pat. No. 4,414,370 and commonly assigned copending application Ser. No. 388,764 filed June 15, 1983.

It has been disclosed in U.S. Pat. No. 4,117,235 that batches of an acrylic monomer can be thermally polymerized in sealed glass tubes at temperatures from 230° C.-280° C. to provide an acrylate polymer with a number average molecular weight of less than about 5,000, in the presence or absence of a chain transfer agent or solvent. Excessively long reaction times of 16-18 hours are proposed. The process is conducted as a batch process with a bulk monomer charge and a subsequent long term cook at the reaction temperatures.

U.S. Pat. No. 3,979,352 discloses styrene-acrylic copolymers having an Mn said to be from 600 to 4,000. The process for preparing the copolymers is conducted in a heated tube. No polydispersities or distribution indexes are provided.

In order to provide clear, acrylic type copolymers having high solids content, narrow molecular weight distribution and low solution viscosity, the art has long sought a fast, efficient, high yielding process capable of selectively producing a wide spectrum of hard, soft, thermoplastic or coreactable to thermosetting copolymers, which is safe, energy efficient and capable of using existing equipment without undue modifications required for long term, ultra-high temperature operation.

It has been suggested that a continuous bulk polymerization process would be extremely advantageous to provide acrylic copolymers in terms of cost, quality of product and stability. It is understood that solution-type batch processes employing large quantities of solvent and initiator are unsatisfactory, since too many impurities, including solvent, remain in the polymer, the quality of produced polymer is low and efficiency is low, as reported in U.S. Pat. No. 4,328,327. The continuous process proposed therein, however, employs reaction residence times up to 10 hours. It is also noted that when purity is critical, it is advisable not to use a polymerization initiator. Reaction temperatures are said to be below about 160° C.

Accordingly, the art has sought, a continuous bulk polymerization process capable of selectively providing high yields of high purity, low molecular weight acrylic polymers suitable for high solids applications. The term "acrylic polymers" refers to the addition polymer formed by polymerizing acrylic monomers. The acrylic polymers sought should exhibit a narrow molecular weight distribution, low solution viscosity, low dimers and trimers content, low volatiles content, and good color. The process should be energy efficient and adapted for use with conventional equipment.

SUMMARY OF THE INVENTION

These and other objects are attained in a continuous bulk polymerization process for preparing enhanced yields of high solids, low molecular weight acrylic polymer product having a narrow molecular weight distribution and a low chromophore content comprising the steps of continuously:

(a) charging into a continuous mixed reactor zone containing a molten resin mixture;
  (i) at least one acrylic monomer;
  (ii) a polymerization initiator in amounts to provide a molar ratio of said initiator to said acrylic monomer from about 0.0005:1 to 0.06:1;
  (iii) from about 0 to 25 percent based on the weight of acrylic monomer of a reaction solvent, wherein said molten resin mixture comprises unreacted acrylic monomer and the acrylic polymer product;
(b) maintaining a flow rate through said reaction zone sufficient to:
  (i) provide a residence time of said charged acrylic monomer in said reaction zone of at least about one minute; and
  (ii) maintain a predetermined level of reaction mixture in said reaction zone, and;
(c) maintaining the molten resin mixture at an elevated reaction temperature sufficient to provide accelerated conversion to a readily processable, uniform, concentrated polymer product.

The flow rate in the process of the invention is adjusted to provide, generally, a residence time of monomer in the reaction zone from about 1 to 30 minutes. Reaction temperatures can be from about 180° C. to 270° C. based upon the identity of monomers selected, the levels of initiator and solvent, if any, employed, the flow rate selected and the properties of the polymer product desired. Although the exact initiation mechanism is not known, the small amount of polymerization initiator present helps to control the purity, weight distribution, molecular weight and yield of the resulting polymer. The solvent, when employed, assists in reducing viscosity of product and lowering the required reaction temperature, may aid in reducing molecular weight of the product (possibly as a chain transfer agent) and also may improve conversion and uniformity of the product.

It has been found that high solids content acrylic polymers containing on the order from 75–99% nonvolatiles, (n.v.) can be produced by the process of the present invention at a conversion rate of at least about 75% of the theoretical yield (monomer to polymer). The acrylic polymers produced by the process of the invention typically exhibit a polydispersity between about 1.5 and 3, a distribution index less than about 5.0 and an Mn between about 1,000 and 2,500. Unless otherwise indicated, molecular weights are determined employing gel permeation chromatography.

The glass transition temperature of the acrylic polymers produced by the inventive process is dependent on both molecular weight and the composition. The polymer product can often be selectively formed as a solid or liquid depending upon the end use desired. The process can employ conventional continuous stirred reactor equipment.

In general, either a single acrylic monomer or a mixture of two or more acrylic monomers, often including a functional monomer, are charged continuously, along with low levels of initiator and optionally low levels of solvent, into a reaction zone containing molten resin having the same ratio of acrylic monomers as in the monomer mixture. The molten resin (and reaction solvent, if present), is maintained at a preset reaction temperature to provide a polymer of desired molecular weight and distribution. The reaction product is pumped out of the reactor zone at the same flow rate as the monomers are charged to provide a fixed level of molten resin in the system.

To reduce the unreacted monomer and/or solvent content of the polymer product, the molten resin mixture may be subjected to a separation means to remove or reduce the content of unreacted monomer and/or solvent and any volatile by-products. Such unreacted monomer and/or solvent may be recovered and reused in the system. Other objects and advantages will be apparent in view of the detailed description of the invention provided.

DESCRIPTION OF PREFERRED EMBODIMENTS

The term "acrylic monomer" as employed herein includes acrylic or methacrylic acid, esters of acrylic or methacrylic acid and derivatives and mixtures thereof. Examples of suitable acrylic monomers include the following methacrylate esters: methyl methacrylate, ethyl methacrylate, n-propyl methacrylate, n-butyl methacrylate, isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, N,N-dimethylaminoethyl methacrylate, N,N-diethylaminoethyl methacrylate, t-butylaminoethyl methacrylate, 2-sulfoethyl methacrylate, trifluoroethyl methacrylate, benzyl methacrylate, 2-n-butoxyethyl methacrylate, 2-chloroethyl methacrylate, sec-butyl-methacrylate, tert-butyl methacrylate, 2-ethylbutyl methacrylate, cinnamyl methacrylate, cyclohexyl methacrylate, cyclopentyl methacrylate, 2-ethoxyethyl methacrylate, furfuryl methacrylate, hexafluoroisopropyl methacrylate, 3-methoxybutyl methacrylate, 2-methoxybutyl methacrylate, 2-nitro-2-methylpropyl methacrylate, n-octylmethacrylate, 2-ethylhexyl methacrylate, 2-phenoxyethyl methacrylate, 2-phenylethyl methacrylate, phenyl methacrylate, propargyl methacrylate, tetrahydrofurfuryl methacrylate and tetrahydropyranyl methacrylate.

Typical acrylate esters employed include: methyl acrylate, ethyl acrylate, n-propyl acrylate, isopropyl acrylate, n-butyl acrylate and n-decyl acrylate.

The acrylic monomer can also include acrylates or methacrylates containing functional groups, such as hydroxy, carboxyl, amino, isocyanate, and the like. The functional polymers are usually prepared by polymerization employing a functional monomer or by post-reaction of a polymer of the invention to introduce the desired functionality.

Acrylic acid derivatives employed as the acrylic monomer include: acrylic acid, acrylonitrile, methyl alpha-chloroacrylate, methyl 2-cyanoacrylate, N-ethylacrylamide, and N,N-diethylacrylamide.

Esters of methacrylic acid or acrylic acid containing a suitable functional group may be used as the monomer. Typical preferred functional acrylates and methacrylates include acrylic acid, methacrylic acid, hydroxy alkyl acrylates, and hydroxyl alkyl methacrylates.

Examples of preferred hydroxy functional monomers include 2-hydroxyethyl acrylate, 3-chloro-2-hydroxypropyl acrylate, 2-hydroxy-butyl acrylate, 6-hydroxyhexyl acrylate, 2-hydroxymethyl methacrylate, 2-hydroxypropyl methacrylate, 6-hydroxyhexyl methacrylate, 5,6-dihydroxyhexyl methacrylate and the like.

Hydroxyl or other functionality may also be introduced into the polymers of the invention by post-reacting a polymer with standard techniques such as esterification or transesterification techniques.

The present invention is also applied to the preparation of copolymers from mixtures of two or more acrylic monomers such as comonomers, termonomers and tetramonomers. It is also contemplated that mixtures of at least one acrylic monomer and at least one non-acrylic non-styrenic ethylenic modifying monomer may be polymerized in accordance with the present invention.

Suitable modifying ethylenic monomers include: vinyl acetate, vinyl pyridine, vinyl pyrollidone, methyl crotonate, crotonic acid and maleic anhydride.

Preferred monomer charges include the comonomer charges, such as 2-ethylhexyl acrylate and acrylic acid, the termonomers, such as 2-ethylhexyly acrylate, methyl methacrylate and vinyl acetate and the tetramonomers; such as vinyl acetate, butyl acrylate, methyl methacrylate and 2-hydroxy ethyl methacrylate. By preselecting an appropriate monomer and concentration of such monomer the glass transition temperature, Tg, of the resulting polymer can be modified to provide a harder or softer polymer, as required. Monomers tending to yield higher melting "harder" polymers are, for example, $C_1$–$C_3$ alkyl methacrylates or vinyl acetate. Monomers tending to yield softer polymers include the alkyl acrylates and $C_4$ and higher methacrylates, such as n-butyl acrylate, 2-ethylhexyl acrylate and n-octyl acrylate.

Preferred copolymers prepared by the process in addition to homopolymers of the invention include those hard and soft polymers wherein the weight ratio of "hard" to "soft" acrylic monomers is from about 1:5 to 5:1. Especially preferred soft polymers having wide application are those formed from acrylic ester monomers, such as $C_4$–$C_8$ alkyl acrylates and methacrylates.

The preferred monomeric charge for preparing acrylic copolymers employs from about 50–95%, preferably about 60–90% of at least one acrylic monomers, and from about 5–50%, preferably about 40–10% of a functional acrylic monomer.

The preferred functional polymers of the instant invention have an acid or hydroxyl functionality. The hydroxyl polymers should contain sufficient hydroxyl group containing monomers to allow cross linking of the polymers of the invention. Examples of such polymers which may be prepared by the present invention are disclosed in U.S. Pat. Nos. 4,178,320, 4,276,212, 4,276,432 and 4,293,661.

The preferred alkyl ester of acrylic or methacrylic acid have alkyl groups having from one to eight carbon atoms and include, for example, the methyl, ethyl, propyl, butyl, isobutyl, isoamyl, 2-ethylhexyl and octyl, acrylates and methacrylates.

The hydroxy alkyl acrylates and methacrylates contain an alkylene group having from 2 to 6 carbon atoms to which the hydroxy group is attached. Examples of these monomers are hydroxyethyl acrylate or methacrylate, hydroxypropyl acrylate or methacrylate and hydroxyhexyl acrylate or methacrylate. Other copolymerizable monomers can also be utilized.

Preferred thermosetting polymers include the terpolymers, such as methylmethacrylate/2-ethylhexyl acrylate/hydroxyethyl methacrylate, butyl acrylate/methyl methacrylate/hydroxyethyl methacrylate and vinyl acetate/butyl acrylate/hydroxyethyl methacrylate.

The thermosetting polymers prepared by the inventive process may be solids or liquids at room temperature. For the purposes of this invention a polymer is considered a liquid, if it has a Gardner-Holdt Viscosity, measured at 25° C., of less than about Z-6.

The identity and amounts of formulation added cross-linking agent are preselected taking into consideration the glass transition temperature ($T_g$) of the thermosetting polymer to provide a solid or liquid coating composition, as desired. Accordingly, by preselecting the appropriate polymer and crosslinker, liquid products may be obtained. As such, they may be used alone, without solvents, in many coating applications.

Examples of curing agents which may be utilized for cross-linking the polymeric products include polyepoxides, polyisocyanates and urea-aldehyde, benzoguanamine aldehyde, or melamine-aldehyde condensation products and the like. Particularly desired are the melamine-formaldehyde condensation products, such as polymethoxymethyl melamines, preferably hexamethoxymethylmelamine. When melamine-formaldehyde or urea-formaldehyde curing agents are utilized, it is preferred that an acid catalyst, such as toluene sulfonic acid, be employed to increase the cure rate. Typically, these cross-linking curing agents are products of reactions of melamine or urea, with formaldehyde and various alcohols containing up to and including 4 carbon atoms. These liquid cross linking agents have substantially 100 percent nonvolatile content. For the purposes of the invention it should be recognized that it is important not to introduce extraneous diluents that would lower the final solids content of the coating.

Particularly preferred cross linking agents are those sold by American Cyanamid under the trademark "Cymel". In particular, Cymel 301, Cymel 303 and Cymel 1156, which are alkylated melamine-formaldehyde resins are useful in the compositions of this invention.

The initiators suitable for carrying out the process according to the present invention are compounds which decompose thermally into radicals in a first order reaction. Suitable initiators preferably have half-life periods (pot-lives) in the radical decomposition process of about 1 hour at 90° C. and more preferably 10 hours at 100° C. Others with about 10 hour half-lives at temperatures significantly lower than 100° C. may also be used. Suitable initiators are, for example, aliphatic azo compounds such as 1-t-amylazo-1-cyanocyclohexane, azo-bis-isobutyronitrile and 1-t-butylazo-cyanocyclohexane and peroxides and hydroperoxides, such as t-butylperoctoate, t-butyl perbenzoate, dicumyl peroxide, di-t-butyl peroxide, t-butyl hydroperoxide and cumene hydroperoxide and the like. The particular initiator is not critical so long as the initiator will generate free radicals.

The initiator is preferably added simultaneously with the monomers. For this purpose it is either admixed with the monomer feed or added to the process as a separate feed. Initiator levels are an important consideration in the process of this invention.

It was previously thought that the presence of styrene-type monomers was necessary to the overall reaction kinetics of bulk polymerization to produce a polymer having a tight molecular weight distribution, low viscosity and low color. However these low molecular weight polymers from non-styrenic monomers can be produced using a continuous bulk polymerization process at temperatures between 180°–270° C. and including a small percentage of a free radical initiator as in the present invention. The resulting products were surprising because the amount of initiator is relatively low and there were no monomers which typically undergo thermal initiation.

At temperatures outside the range of 180°–270° C. various problems have surfaced. At low temperatures, i.e. below 180° C. the molecular weight of the product increases. The products formed at these low temperatures are quite viscous and difficult to handle. At high temperatures, undue quantities of dimers and trimers are formed. The ceiling temperature is the temperature at which the rate of polymerization equals the rate of depolymerization. Near the ceiling temperature, the competition between polymerization and depolymerization leads to a lowering of polymerization rate, a lowering of the molecular weight of the resulting polymer, a decrease in conversion, and an increase in the heterogeneity of the resultant polymer.

This phenomenon, in turn, accounts, in part, for the presence of excessive amounts of impurities and chromophores (colored bodies which are formed at temperatures above about 270° C.). Further, at high reaction temperatures, excessive demands can be placed on valves, seals and fittings in conventional polymerization equipment. There exists a greater tendency for breakdowns, leaks and overheating at such elevated temperatures.

Accordingly, it has been found that when the molar ratio of initiator to monomers charge is at least about 0.0005:1, it is possible to reduce the reaction temperature to improve purity, color, conversion and ease processing conditions, while maintaining or improving low molecular weight and molecular weight distribution. In addition, the yields of polymer product recovered, without recycle, can be on the order of at least 75% of the theoretical. When yields lower than about 75% of theoretical are produced, then, during recycle of the product to improve yields, various problems are encountered. For example, the ratios of unreacted monomers can vary widely, especially at substantially lower yields. Upon recycling, the polymer thus produced can be quite different in proportions of monomers from that desired. The solids content of the product will also suffer and the quality will be compromised. Also the added volume of product to be recycled requires additional monitoring and storage equipment.

It is possible to mitigate the effects of reduced conversion by adjusting the feed during recycling to take into account the presence of varying ratios of unreacted monomers.

Depending upon the identity of monomers selected, it may be that the product will benefit from the adjustment of the feed content, even at higher conversions.

Use of excess initiator is costly and does not significantly improve either the properties of the resulting polymer nor affect the reaction conditions sufficiently to normally justify the added expense. Accordingly, in general, a mole ratio no greater than about 0.04:1 of initiator to total monomers charge need be employed. If desired, a somewhat higher ratio may be employed, under certain circumstances, usually up to about 0.06:1, to provide another means to reduce the molecular weight and improve distribution of the resulting product. However, best conversion and weight distribution is usually achieved with the mole ratio of initiator to monomer of about 0.005:1 to 0.04:1. As the only source of initiation is believed to be the initiator, it is surprising that such a relatively small amount of initiator could produce products having a narrow molecular weight range and a low molecular weight. This may be due to unexpectantly high levels of radical chain transfer by the monomers themselves, however this theory has not yet been proven. Further the yields according to the present process are usually close to quantitative, i.e. often approaching 100% of theoretical.

It is particularly preferred for industrial purposes to employ a molar ratio of about 0.005:1 to 0.015:1 of initiator to monomers.

If desired, from about 0 to 25 percent and preferably from 0 to 15 percent of reaction solvent is employed based on the weight of monomers. The solvent, when employed, is added simultaneously with the monomer feed or is added to the reaction as a separate feed. The selection of a particular solvent and its level of addition are made, inter alia, based on the monomers selected, the desired applications for the polymer produced and also to assist in controlling reaction parameters. In general, it is preferred to use as little solvent as possible to reduce separation and recovery requirements and minimize the formation of contaminants. It is postulated that the chain transfer effects of solvents may contribute to the production of excess dimers, trimers and to the production of by-product chomophores.

In general, the use of a solvent permits a lower reaction temperature to be employed, allows lower flow rates, reduces the solution viscosity of the molten polymer product, acts as a heat sink to prevent run-away reactions and reduce cooling requirements, assists in plasticizing the polymer product, and may reduce the acid number if the solvent esterifies with the resin and may reduce molecular weight of the resulting product.

Most conventional polymerization or reaction solvents may be utilized in the present process to prepare the low molecular weight polymers of the instant invention. The higher boiling solvents are preferred due to their low pressure at high temperatures. In general, solvents having a boiling point above 100° C., especially 150° C. are more preferred. Examples of such higher boiling solvents include the aromatic alcohols, such as benzyl alcohol, the toluene alcohols and the like; the alcohol and glycol ethers, esters and mixed ethers and esters, such as diethylene glycol, Cellosolve (registered trademark of the Union Carbide Corporation), butyl Cellosolve, Cellosolve acetate, the Carbitols (registered trademark of the Union Carbide Corporation), the (poly) alkylene glycol dialkyl ethers and the like.

In addition, if there is minimal reaction, some glycols may also be utilized as the reaction solvent including ethylene, propylene and butylene glycols and their various polyether analogs. The aliphatic alcohols, such as hexanol and decanol, can also be used. Further, various hydrocarbon fractions may be utilized with the most preferred being Solvesso 150 or Solvesso 100 (a registered trademark of the Humble Oil and Refining Company.) Aromatic solvents can also be employed, for example, toluene, xylene, cumene, and ethyl benzene.

The preferred solvents are the cellosolve acetate and the isoparaffinic hydrocarbons such as those sold by Exxon Chemical under the trademane Isopar. Especially useful isoparaffinic hydrocarbons are those with a boiling range between 130° and 190° C.

Although not necessary to obtain the desirable results of the process of the present invention, it may be desirable when trying to produce a particular property or particularly low molecular weight to incorporate a small amount of a chain transfer agent. Typically the chain transfer agent, if used, will be used in an amount of from 0 to 2 mole percent. Typical chain transfer agents include: bromotrichloromethane, isooctyl beta-mercaptoproprionate, and the like.

The molten resin mixture in the reaction zone is maintained at an elevated reaction temperature sufficient to provide accelerated conversion to a readily processable, uniform, concentrated polymer product. In general, for these and other purposes the reaction temperature is preferably maintained at from about 180° C. to 270° C. At temperatures below about 180° C., the polymer product tends to exhibit a higher molecular weight and broader molecular weight distribution than generally accepted for high solids applications, unless excessive solvent addition is employed. The reaction conversion rate is reduced and higher molecular weight fractions are also increased. The product tends to become unduly viscous for efficient processing and high solids products cannot be obtained readily.

At reaction temperatures from about 180° C. to about 215° C., it is often useful to employ a solvent in the process of the invention to increase conversion rate, increase uniformity of the product, obtain fewer chromophores, and reduce viscosity. If desired, the amount of initiator employed may be increased in accordance with the invention to improve reaction parameters and enhance product properties.

As reaction temperature approaches or exceeds about 270° C., the quality of the product may be compromised. For example, at higher reaction temperatures the polymer products tend to be discolored and exhibit undesired yellowing, possibly caused by formation of undesired by-products, such as oxidation products. Further, the resulting polymer products may be subjected to excessive ceiling temperature effects as depolymerization, reversible reactions and other side reactions which can yield dimers, trimers and other low molecular weight oligomeric contaminants. Such by-products contaminate the product polymer and can contribute to its off-color or can cause substandard finishes from coating compositions made from them. In addition, reaction equipment tends to degrade rapidly at such elevated temperatures, which can cause leaking of reaction mix from valves, fittings and seals.

In general, best results are obtained and accordingly, it is more preferred to employ reaction temperatures from about 215° C. to 260° C.

In general, the reaction time or residence time in the reaction zone is controlled by the rate of flow of constituents through the reaction system. The residence time is inversely proportional to flow rate. It has been found that at a given temperature, the molecular weight of the polymer product generally increases as the residence time increases.

In accordance with these factors it is therefore preferred to utilize reaction residence times of at least about 1 minutes to provide satisfactory reaction completion. Therefore it appears that often best results are obtained when the reaction residence time is minimized. Often this lower limit is controlled by polymerization heat removal. Additionally, steady state reaction conditions are difficult to achieve. While the residence time in the reaction zone may be as long as 1 hour at lower reaction temperatures, normally discoloring reactions and other side reactions will dictate that shorter residence times be employed. For most cases a residence time of from about 1 to 30 minutes, and, preferably, from 1 to 20 minutes. In general, longer residence times may increase the yield of product, but the rate of increase of product yield is generally very slow after about 30 minutes of reaction. More importantly, after about 30 minutes, depolymerization tends to occur with formation of undesired chromophores and by-products.

The particular flow rate selected will depend upon the reaction temperature, constituents, desired molecular weight of product, desired polydispersity and the particular equipment employed.

For best results, to produce a given resin of a desired Mn and Mw with low residual monomer, the reaction temperature and residence times are mutually manipulated in accordance with the principles provided herein.

The reaction pressure in an enclosed system is a function of residual vapor pressure of unreacted monomer and other volatiles present either in the feed (such as water) or in the reaction mix side reaction products. Although at steady state the process is carried out under a positive pressure, the reaction pressure appears to have no significant effect on the yield. The upper limit of reaction pressure is a function of equipment capability, while the lower limit is a function of feed rate and monomer composition. At higher temperatures, the higher gas pressures which result may require special equipment and procedures for safe handling.

The polymers produced by the process of the invention suitable for high solids applications have an Mn from about 700 to about 6000, preferably from about 1000 to 3000 and most preferably from about 1000 to 2500. When such resins are employed, with or without an applications solvent, depending upon their Tg and final use, they should exhibit a viscosity from about 0.1 to about 5 poise. For thermosettable resins the preferred viscosity is from about 0.5 to 1 poise. These viscosities correspond to a Gardner-Holdt values of A-4 to S and A-D respectively. For this and other purposes the polydispersity ratio for the polymers produced by the inventive process is less than about 3 and more preferably less than about 2.5 and most preferably from about 1.5 to 2.2. The distribution index should be less than about 5.0, and for best results, should preferably be less than about 4.0.

The present process is adapted to achieve yields, without recycle, of at least about 75% of theoretical. With proper selection of reaction parameters and monomers in accordance with the detailed description of the invention provided, yields from 90 to 99% of theoretical are regularly achieved at residence times from 1 to 20 minutes and with a nonvolatile content from 90 to 99%.

The resins may be recovered as liquids or solids depending on the Tg of the resulting resin. Certain carboxyl group containing resins may be converted for aqueous resin cuts by neutralization of the acid functionality with a base such as ammonia.

The high solids thermoset, cross-linkable polymers have many applications. They are readily formulated into enamel appliance coatings, overprint varnishes, adhesives and auto-, truck- or airplane exterior finishes, coatings, and the like.

The hard and soft high solids, addition polymers are readily formulated into floor finishes, ink dispersants, water based clear overprint varnishes, impregnants, binders, plasticizers, leveling agents, melt flow improvers and the like.

Other softer resins may be used as functional fluids, oils and the like.

By employing the polymers of the invention, essentially solvent-free coatings systems may be obtained having usable viscosities at room temperature, which systems are applicable in standard industrial coating processes, including hot spraying, roll coating and the like. The products prepared from the process of the invention are formulated into such coating systems by addition of solvents, fillers, pigments, flow control agents and the like. Such coatings can be applied, with the addition of conventional adjuvants, to cans, coils, fabrics, vinyl, paper, metal furniture, wire, metal parts, wood paneling and the like.

Alkali soluble resins, i.e. those containing acid functionality, may be formulated into resin cuts employing available aqueous bases, to provide exceptional leveling and detergent-resistant properties when incorporated into a floor polish composition with a suitable metallized acrylic, methacrylic or copolymer emulsion, a wax emulsion, and adjuvants such as plasticizers, surfactants, anti-foaming agents of organic solvents and/or organic bases. The wax formulations yield exceptional gloss, color-free finishes, and are highly resistant to yellowing and detergent action.

Inks with excellent adhesion properties can be formulated with the instant polymers as binding agents.

The process of the present invention involves the use of a variable fillage type stirred reactor for the polymerization of acrylic monomers to copolymers having a narrow-molecular weight distribution by the proper balancing of the conditions of polymerization and flow rates. The reaction zone can comprise a continuous stirred tank reactor of any type adapted for variable fillage operation of from as low as 10% to 100% of the usable volume thereof for the production of vinylic polymers. This continuous stirred tank reactor may be either horizontal or vertical and should have provision for close control of the temperature therein by any desired means, including control by a cooling jacket, internal cooling coils or by withdrawal of vaporized monomer followed by condensation thereof and return of the condensed monomer to the reaction zone. It will be apparent to those skilled in the art that this reaction zone can, if desired, be constituted by a plurality of continuous stirred tank reactors operated in series. Likewise, it will be apparent that such reaction zone can comprise more than one continuous stirred tank reactor operated in parallel, if it is desired to employ several relatively small reactors to supply the capacity of the final reaction zone rather than a single large reactor for that purpose.

It is within the scope of the invention to modify an extruder or a back mix reactor to permit the process to be conducted therein.

A preferred form of continuous stirred reactor which has been found quite suitable for carrying out the process is a tank reactor provided with cooling coils sufficient to remove any heat of polymerization not taken up by raising the temperature of the continuously charged monomer composition so as to maintain a preselected temperature for polymerization therein. Preferably such a continuously stirred tank reactor will be provided with at least one and usually more, vaned agitators driven by an external power source, such as a motor. At least one such agitator is positioned to provide agitation of liquid contained in the reactor while operating at minimum fillage, i.e., as low as 10% of the volume thereof. Such a continuous stirred tank reactor can, if desired, be provided with additional features for improved efficiency of operation and safety, such as an additional series of internal cooling coils adapted to effectively prevent any "run-away" polymerization if the normal holding period has to be extended for some reason and an outer jacket for additional cooling or heating of the contents of the reactor.

In operating the present continuous bulk, polymerization process, flexibility and range of choice can be realized in polymer types produced, as well as in the production rate thereof, by proper choice of polymerization reaction conditions. In operation, a monomer feed composition comprising polyalkenyl aromatic and acrylate monomers and an initiator as described above, is charged to the reactor and the temperature of the monomer feed is raised to from about 180° C. to 270° C. to induce polymerization. The reactor is charged from a stirred feed tank which contains the reaction charge of monomers. Pressure in the reactor can vary from 40 to 400 psia or even higher.

After the initial fillage of the reactor to the desired preselected level and polymerizing the charged monomer to approximately the desired solids content, the volume of monomer composition charged thereto is adjusted to a value to maintain such preselected level of liquid in the reactor. Thereafter, the liquid mixture of polymer and monomer is withdrawn from the reactor, to maintain the preselected level of such liquid mixture in the reaction zone. Polymerization conditions are continously maintained in the reactor to produce a polymer of selected molecular weight and selected degree of conversion or weight percent solids of polymer in such liquid mixture. The reaction zone can be operated so as to produce a liquid mixture with a polymer concentration or percent solids from as low as about 50 percent to as high as 99 percent by weight. The level of fillage of the reactor can vary from as low as 10 percent to as high as 100 percent of usable volume and may be controlled by any desired means, for example, a level controller and associated valve or pump in the transfer line from the reactor.

Any desired means of controlling the temperature within the reactor may be employed. It is preferred that the temperature be controlled by circulation of a cooling fluid, such as oil, through internal cooling coils in those reactors so equipped. The entry of relatively cool monomer composition serves to remove the greater proportion of the heat of polymerization released and the internal cooling coils serve to remove the remainder so as to control the temperature of the liquid mixture therein to a preselected value and thus produce a polymer of the desired degree of conversion and average molecular weight and distribution.

As the polymer concentration increases, the possibility of damage from "run-away" reactions is substantially reduced. In general it is preferred to produce in the reaction zone a solids content of from 80 to 99% by weight of the polymer of Mn from about 1000 to 3000 and of relatively narrow molecular weight distribution. The residence time in the reaction zone can vary from about 1 to 60 minutes.

After reaction, the resulting mixture is subjected to separation and product recovery. Unreacted monomer is preferably recycled to the monomer feed. During the separation step, volatile components, such as solvent and other byproducts are vaporized and recycled, where appropriate. Also, during separation the reaction mix is preferably conducted to a devolatizer, which vaporizes volatile components from the mix. For this step, conventional equipment is readily available, such as a thin film evaporator.

In general, the equipment for the present process is known to the art and has been described for use in other bulk polymerization procedures, as in U.S. Pat. No. 3,968,059 and U.S. Pat. No. 3,859,268.

During the recovery step, the resin product pumped from the devolatizer can be solidified by appropriate means or cut into an appropriate solvent system. The resin product may be solidified by employing a conventional flaker. The product flakes can be packaged in accordance with known techniques. For example, the flakes may be conducted to a flake bin by suction and then transported to a bagger.

The following examples are set forth to illustrate more clearly the principles and practice of this invention to one skilled in the art. As such, they are not intended to limit the invention but are illustrative of certain preferred embodiments. In these Examples, the molecular weight of polymer product was determined by conventional gel permeation chromatography methods.

EXAMPLE 1

A vertical stirred tank reactor of one gallon capacity having an oil jacket capable of being heated or cooled, was heated and maintained at reaction temperature of 230° C. The reactor was thereafter filled to 50% of its volume with 2-ethylhexylacrylate and ditertiary butyl peroxide in a 0.005:1 more ratio to the monomers. Additional 2-ethylhexylacrylate was metered in from a feed tank at a constant delivery rate. Polymerization was immediately initiated as the 2-ethylhexylacrylate was introduced into the reactor. The contents of the tank reactor were continuously stirred. After the reactor was filled to 50% of capacity, an outlet port was opened and the 2-ethylhexylacrylate reaction mixture was continuously withdrawn. Simultaneously, fresh 2-ethylhexylacrylate monomer was added to maintain the 50% fillage level in the reactor. For this purpose the feed rate was maintained at 0.26 pounds per minute per gallon of reactor to achieve a residence time of 15 minutes. Oil was circulated through the reactor jacket to maintain a constant reaction temperature of 230° C.

Thereafter the reaction mix was introduced into a thin film evaporator at which time the volatile components, including unreacted monomers and by-products, were evaporated and a polymer product was recovered. The yield of product was 96.3% of theoretical.

A homopolymer of 2-ethylhexylacrylate was produced having Mn of 1820, a Mw of 3460, a Mz of 6480, a polydispersity ratio of 1.9, and a distribution ratio of 3.57. The nonvolatiles of the resulting polymer were 98.9% and the polymer had a Gardner color of 1 and a Gardner-Holdt viscosity of Z.

Unless otherwise noted in the following examples, the initiator utilized is ditertiary butylperoxide. Furthermore, the residence time, unless otherwise noted, is 15 minutes.

EXAMPLE 2

The procedure of Example 1 was repeated with the exception that the residence time was varied from 1 to 30 minutes was shown in Table 1. The Gardner color, the Gardner and Brookfield viscosities, the molecular weights and distributions were determined as well as the glass transition temperature and the conversion for each of these runs. This data is shown in Table 1.

TABLE I

| RUN | A | B | C | D | E | F | G | H |
|---|---|---|---|---|---|---|---|---|
| TIME (min.) | 1 | 2 | 3 | 5 | 10 | 15 | 20 | 30 |
| PROPERTIES COLORS VISC. | 1 | 1 | 1 | 1 | 1 | 1 | 1 | 1 |
| GARD. | Z | Z/Z-1 | Z/Z-1 | Z/Z-1 | Z/Z-1 | Z/Z-1 | Y/Z | Z/Z-1 |
| BROOK. | 2375 | 2888 | 3050 | 3130 | 2892 | 2650 | 3060 | 3650 |
| Mn | 1730 | 1780 | 1810 | 1740 | 1720 | 1750 | 1700 | 1800 |
| Mw | 3630 | 3790 | 3870 | 3810 | 3800 | 3960 | 3400 | 4100 |
| Mz | 7710 | 8180 | 8350 | 8170 | 8270 | 8610 | 6600 | 8700 |
| W/N | 2.09 | 2.12 | 2.14 | 2.19 | 2.21 | 2.26 | 2.04 | 2.29 |
| Z/N | 4.44 | 4.59 | 4.62 | 4.7 | 4.8 | 4.91 | 3.96 | 4.92 |
| Tg | −84 | −84 | −83 | −84 | −83 | −82 | −81 | −70 |
| CONVERSION | 97.5 | 97.9 | 96.4 | 83.2 | 85.6 | 97.4 | 95% | 96% |

As indicated in Table I, the color of all the samples produced is quite good and the molecular weight distributions W/N and Z/N are quite uniform, generally being less than 2.3 and less than 5. Table I shows that there is relatively little effect caused by residence time, as the polymers generally are similar throughout the entire residence time range period.

EXAMPLE 3

The procedure of Example 1 was repeated with the exception that the initiator level was varied as shown in Table II.

TABLE II

| RUN | A | B | C | D | E | F* |
|---|---|---|---|---|---|---|
| INITIATOR (Moles %) | 0.25 | 0.50 | 2.0 | 4.0 | 6.0 | 8.0 |
| PROPERTIES COLOR VISC | 1 | 1 | 1 | 1 | 1 | 3 |
| GARD. | Z-1 | Z | Z/Z-1 | Y/Z | Y | X |
| BROOK | 2544 | 2950 | 2650 | 2108 | 1920 | 1444 |
| MW | | | | | | |
| N | 1850 | 1820 | 1750 | 1640 | 1570 | 1500 |
| W | 3530 | 3460 | 3960 | 3900 | 3900 | 3680 |
| Z | 6850 | 6480 | 8610 | 9060 | 9220 | 8790 |
| W/N | 1.9 | 1.9 | 2.26 | 2.37 | 2.47 | 2.45 |
| Z/N | 3.7 | 3.57 | 4.91 | 5.52 | 5.85 | 5.87 |
| Tg | −80 | −82 | −82 | −81 | −80 | −82 |
| CONVERSION | 96.2 | 96.3 | 97.4 | 97.2 | 96.4 | 96.1 |

*Comparative Example

Run F of Table II is a comparative example. You can note from this example that as the amount of initiator is increased over 6.0%, the color increased and the viscosity of the product also decreases. Further it is noted that at initiator levels of 4 and above, the Z/N ratio is also greater than 5. This indicates that is preferred to use initiator levels of less than 4 for very tight molecular weight distributions.

EXAMPLE 4

The procedure of Example 1 was repeated except that both the temperature and the initiator level were varied as shown in Table III.

TABLE III

| RUN | A | B | C | D | E | F | G | H |
|---|---|---|---|---|---|---|---|---|
| TEMPERATURE | 190° C. | 190° C. | 215° C. | 230° C. | 240° C. | 266° C. | 270° C. | 282° C. |
| INITIATOR (Moles %) | 0.5 | 6.0 | 6.0 | 0.5 | 2.0 | 2.0 | 0.5 | 0.5 |
| PROPERTIES COLOR VISC. | 1 | 1 | 1 | 1 | 5 | 6 | 3 | 3 |
| GARD. | Z-4 | Z | Z-2/Z-3 | Z | X/Y | V | W | V |

TABLE III-continued

| RUN | A | B | C | D | E | F | G | H |
|---|---|---|---|---|---|---|---|---|
| BROOK. | 10800 | 305000 | 6600 | 2950 | 2620 | 1430 | 1476 | 1104 |
| NW | | | | | | | | |
| N | 2770 | 2900 | 2000 | 1820 | 1500 | 1300 | 1330 | 1240 |
| W | 7300 | 163800 | 7000 | 3460 | 3200 | 2300 | 2300 | 2030 |
| Z | 18920 | 1275000 | 20300 | 6480 | 6700 | 4100 | 4010 | 3380 |
| W/N | 2.63 | 55.58 | 3.52 | 1.9 | 2.09 | 1.77 | 1.74 | 1.64 |
| Z/N | 6.82 | 432.62 | 10.24 | 3.57 | 4.45 | 3.19 | 3.0 | 2.72 |
| Tg | −84 | −77 | −80 | −82 | −80 | −81 | −83 | −84 |
| CONVERSION | 97.2 | 97 | 96 | 96.3 | 92 | 91 | 87.2 | 91.8 |

As is apparent, at relatively low temperatures, the molecular weight distribution is relatively broad while at the intermediate temperatures the molecular weight distribution is quite tight.

EXAMPLE 5

The procedure of Example 4 was repeated with the exception that the solvent level was increased from 0% to 15%.

TABLE IV

| RUN | A | B | C | D | E | F | G |
|---|---|---|---|---|---|---|---|
| TEMPERATURE | 190° C. | 190° C. | 190° C. | 230° C. | 230° C. | 266° C. | 270° C. |
| INITIATOR (Mole %) | 0.5 | 2.0 | 6.0 | 0.5 | 2.0 | 0.5 | 2.0 |
| PROPERTIES | 1 | 1 | 1 | 1 | 1 | 6 | 4 |
| COLOR | | | | | | | |
| VISC. | | | | | | | |
| GARD. | Z-2/Z-3 | Z-2 | Z/Z-1 | X | W | V/W | S |
| BROOK. | 4840 | 3880 | 3300 | 1680 | 1205 | 960 | 644 |
| MW | | | | | | | |
| N | 2200 | 2030 | 1790 | 1490 | 1330 | 1170 | 1030 |
| W | 4250 | 4530 | 5020 | 2510 | 2330 | 1900 | 1560 |
| Z | 7840 | 9840 | 13610 | 4110 | 4060 | 3110 | 2450 |
| W/N | 1.93 | 2.22 | 2.8 | 1.68 | 1.74 | 1.62 | 1.52 |
| Z/N | 3.55 | 4.84 | 7.6 | 2.75 | 3.04 | 2.65 | 2.38 |
| Tg | −82 | −82 | −82 | −82 | −83 | −84 | −85 |
| CONVERSION | 100 | 100 | 97.6 | 97 | 97.6 | 80.2 | 87.6 |

Again the relative values of the molecular weight distributions and the color are good except that substantial color bodies are introduced at temperatures of 266° C. and above.

EXAMPLE 6

The procedure of Example 1 was repeated with the exception that the solvent level is increased to 25% and the temperature and initiator level were varied.

TABLE V

| RUN | A | B | C |
|---|---|---|---|
| TEMPERATURE | 190° C. | 266° C. | 270° C. |
| INITIATOR (mole %) | 2.0 | 2.0 | 2.0 |
| PROPERTIES | 1 | 1 | 5 |
| COLOR | | | |
| VISC. | | | |
| GARD. | Y/Z | V | T |
| BROOK. | 2400 | 701 | 484 |
| MW | | | |
| N | 1710 | 1130 | 950 |
| W | 3220 | 1780 | 1390 |
| Z | 5960 | 2870 | 2180 |
| W/N | 1.87 | 1.57 | 1.46 |
| Z/N | 3.47 | 2.53 | 2.29 |
| Tg | −82 | −87 | −85 |
| CONVERSION | 98.9 | 98.8 | 95.3 |

In each instance the molecular weight distribution is quite good as is the color, except for the run at 270° C.

EXAMPLE 7

The procedure of Example 1 is followed with the exception that the formulation mix contains 55 mole percent 2-ethylhexylacrylate, 30 mole percent hydroxyethyl methacrylate and 15 mole percent methylmethacrylate. This formulation was prepared with a 15 minute residence time, using 2 mole percent of ditertiary butyl peroxide and 0% solvent at 230° C. It produced a hazy yellow product having viscosity too thick to measure using the Gardner method, and a Brookfield viscosity of 55,800 centipoise. The number average of molecular weight was 1,190, the weight average of molecular weight was 2,000 and the Z average molecular weight was 3,380, giving a W/N ratio of 1.67, a Z/N ratio of 2.83 and the conversion of 96.7%.

EXAMPLE 8

The procedure of Example 1 was repeated except that the monomer mixture was 80% 2-ethylhexylacrylate, 20% vinyl acetate and that the reaction temperature was 240° C. The resulting product had a color of 2, a Gardner viscosity of Z-5, a Brookfield viscosity of 10,500 and a molecular weight distribution as follows: Mn 1780; Mw 4900; Mz 12,750 giving a W/N ratio of 2.74 and a Z/N ratio of 7.14 with a conversion of 97.4%. Although this single run of these monomers produced a Z/N ratio outside the desired range, it is felt that resins having a similar composition could be produced with the appropriate molecular weight distribution.

EXAMPLE 9

The procedure of Example 1 was repeated with the exception that the monomer mixture was 80 mole percent 2-ethylhexylacrylate, 20 mole percent acrylic acid, and that the reaction temperature was 220° C. The resulting product had a yellow color and was too thick to measure either using the Gardner or Brookfield viscosity methods. The molecular weight distribution was: Mn 1800; Mw 5020; Mz 13,080, giving a W/N ratio of 2.78, a Z/N ratio of 7.25 and a conversion of 96.1%.

EXAMPLE 10

The procedure of Example 1 was repeated with the exception that 100% butylacrylate was used as the reaction monomer. The solvent level and temperature are varied as shown in Table VI.

TABLE VI

| RUN | A | B | C | D | E | F |
|---|---|---|---|---|---|---|
| TEMPERATURE | 200° C. | 230° C. | 270° C. | 190° C. | 230° C. | 270° C. |
| INITIATOR | 2 | 2 | 2 | 2 | 2 | 2 |
| SOLVENT | 0 | 0 | 0 | 15 | 15 | 15 |
| PROPERTIES COLOR | 1 | 1 | 3 | 1 | 1 | 7 |
| VISC. | | | | | | |
| GARD. | Z-5/Z-6 | Z-2/Z-3 | V/W | Z-3/Z-4 | X | V |
| BROOK. | 19000 | 4080 | 1170 | 7300 | 1648 | 1052 |
| MW | | | | | | |
| N | 2600 | 1880 | 1260 | 2160 | 1360 | 1090 |
| W | 18600 | 5840 | 2520 | 6770 | 2810 | 1940 |
| W | 103150 | 16840 | 4980 | 20330 | 5870 | 3490 |
| W/N | 7.16 | 3.11 | 1.99 | 3.13 | 2.07 | 1.79 |
| Z/N | 39.73 | 8.97 | 3.95 | 9.39 | 4.32 | 3.2 |
| Tg | −65 | −74 | −72 | −69 | −71 | −72 |
| CONVERSION | 97 | 96 | 92 | 100 | 91 | 74 |

In each instances, except at 270° C., a substantially colorles product was obtained. Also the molecular weight distributions were somewhat broad at the low temperatures and narrower at the higher temperatures of 230°–270° C.

EXAMPLE 11

The procedure of Example 1 was repeated with the exception that 15% solvent was incorporated and that the temperature was varied from 170° to 270° C. and that the monomer mixture was 60 mole percent methylmethacrylate and 40 mole percent ethylacrylate. The results are shown in Table VII.

TABLE VII

| RUN | A | B | C |
|---|---|---|---|
| TEMPERATURE | 170° C. | 230° C. | 270° C. |
| INITIATOR | 2 | 2 | 2 |
| SOLVENT | 15 | 15 | 15 |
| PROPERTIES COLOR | 1 | 2 | 12 |
| VISC. | | | |
| GARD. | Too Thick | Too Thick | Z-10 |
| BROOK. | Too Thick | Too Thick | 210,000 |
| MW | | | |
| N | 1730 | 910 | 770 |
| W | 3360 | 1330 | 1060 |
| Z | 6040 | 2030 | 1600 |
| W/N | 1.94 | 1.46 | 1.37 |
| Z/N | 3.49 | 2.24 | 2.07 |
| Tg | −5 | −21 | −32 |
| CONVERSION | 89 | 75 | 42 |

In each instance the relative molecular weight distribution is quite good other than that the conversion levels are relatively low, especially at higher temperatures.

EXAMPLE 12

The procedure of Example 1 was repeated with the exception that the monomer mix was 100% methylmethacrylate and the initiator level was 0.5%. Furthermore the solvent and temperature were varied as shown in Table VIII.

TABLE VIII

| RUN | A | B |
|---|---|---|
| TEMPERATURE | 200° C. | 190° C. |
| INITIATOR | 0.5 | 0.5 |
| SOLVENT | 0 | 15 |
| PROPERTIES COLOR | Solid | Solid |
| VISC. | | |
| GARD. | Solid | Solid |
| BROOK. | Solid | Solid |
| MW | | |
| N | 5300 | 4340 |
| W | 11,500 | 8960 |
| Z | 22,700 | 15,820 |
| W/N | 2.14 | 2.06 |
| Z/N | 4.25 | 3.64 |
| Tg | +80 | +78 |
| CONVERSION | 56% | 77.3% |

The resin produced was solid and no viscosity measurement could be made. The molecular weight distributions are relatively tight, the conversions are moderate.

What I claim is:

1. A continuous bulk polymerization process for preparing enhanced yields of high solids, non-styrenic acrylic polymer product having a number average molecular weight of about 1000 to 2500 a polydispersity ratio of less than about 3; a dispersion index of up to about 5 and a low chromophore content comprising the steps of continuously:
   (a) charging into a continuous mixed reactor zone containing a molten resin mixture consisting esentially of;
      (i) at least one acrylic monomer;
      (ii) a polymerization initiator in amounts to provide a molar ratio of said initiator to said acrylic monomer from about 0.0005:1 to 0.06:1,
      (iii) from about 0 to 25 percent based on the weight of acrylic monomers of a reaction solvent, wherein said molten resin mixture comprises unreacted acrylic monomers and the acrylic polymer product;
   (b) maintaining a flow rate through said reaction zone sufficient to:
      (i) provide a residence time of said charged acrylic monomer in said reaction zone of from about 1–30 minutes; and (ii) maintain a predetermined level of reaction mixture in said reaction zone, and;

(c) maintaining the molten resin mixture at an elevated temperature with the range of from about 180° C. to 270° C. sufficient to provide accelerated conversation to a readily processable, uniform, concentrated polymer product.

2. The process of claim 1 wherein the temperature is within the range from about 215° C. to 260° C.

3. The process of claim 1 wherein at least two acrylic monomers are charged into the reactor zone.

4. The process of claim 1 including the step of separating the polymer product from unreacted monomers and by-products of the reaction.

5. The process of claim 1 in which the initiator has a half-life of about 10 hours at 100° C.

6. The process of claim 5 in which the initiator is a peroxide or hydroperoxide.

7. The process of claim 1 in which the initiator is employed in a mole ratio from about 0.005:1 to 0.04:1.

8. The process of claim 1 in which the initiator is employed in a mole ratio from about 0.005:1 to 0.015:1.

9. The process of claim 1 in which the solvent is selected from a higher boiling (i) aromatic alcohol, (ii) an alcohol or glycol ether, ester, mixed ether and mixed ester, (iii) a (poly)alkylene glycol dialkyl ether, and (iv) a hydrocarbon fraction.

10. The process of claim 4 in which the residence time is from about 1 to 20 minutes.

11. The process of claim 3 wherein the acrylic monomers include about 50–90% by weight of a non-functional acrylic monomer and about 5–50% by weight of a functional acrylic monomer.

12. The process of claim 11 wherein the monomer charge is adapted to form a crosslinkable theremoset polymer which comprises 60–90% by weight of an alkyl ester of acrylic or methacrylic acid and 10–40% by weight of a hydroxy alkyl acrylate or hydroxy alkyl methacrylate.

13. The process of claim 12 wherein the functional acrylic monomer is selected from the group consisting of hydroxyethyl acrylate, hydroxyethyl methacrylate, hydroxypropylacrylate, hydroxypropyl methacrylate, hydroxyhexyl acrylate, hydroxyhexyl methacrylate and mixtures thereof.

* * * * *